No. 884,193. PATENTED APR. 7, 1908.
W. McGLASHAN.
VEHICLE STEERING MECHANISM.
APPLICATION FILED NOV. 12, 1904.
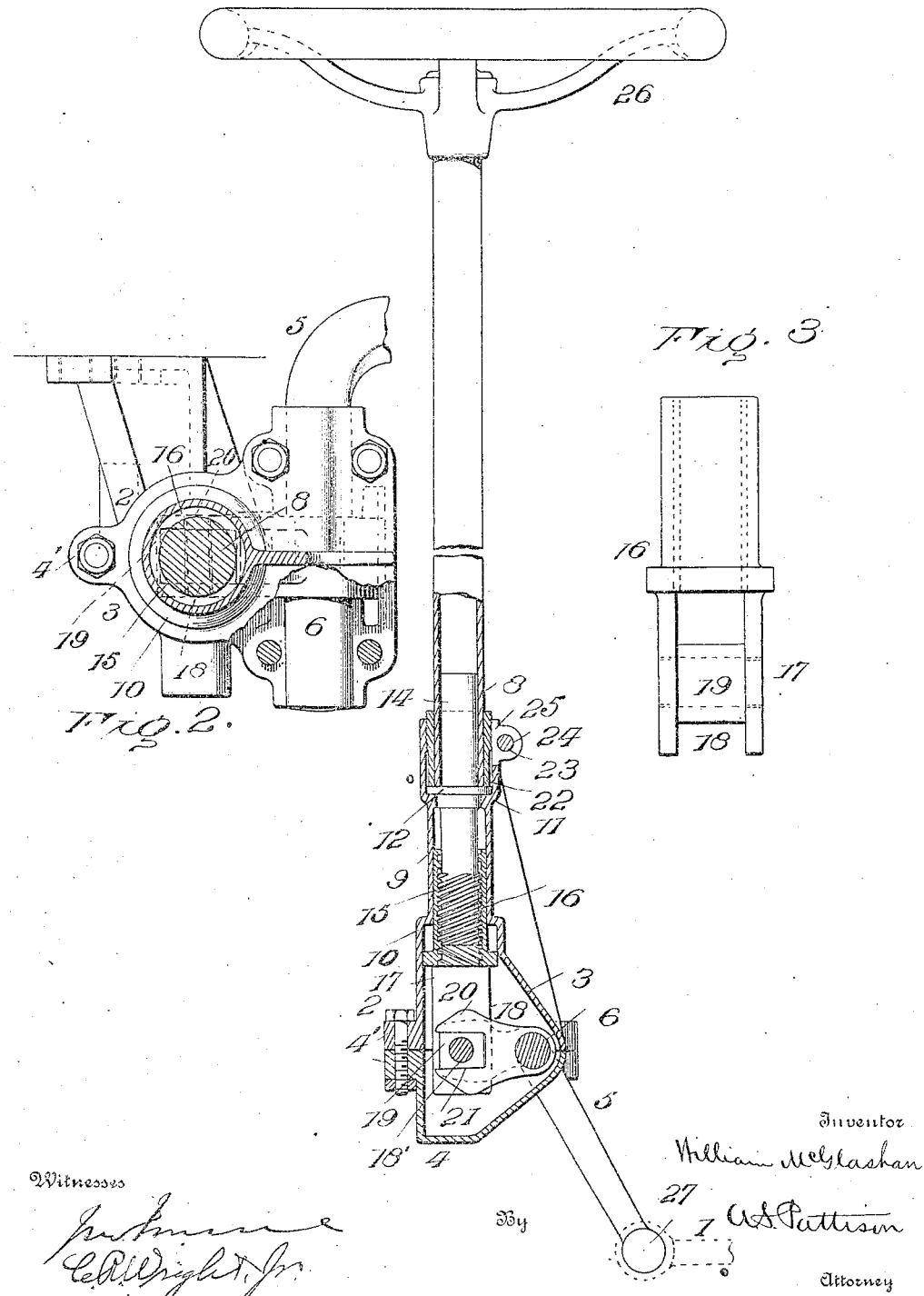

UNITED STATES PATENT OFFICE.

WILLIAM McGLASHAN, OF CLEVELAND, OHIO, ASSIGNOR TO THE WINTON MOTOR CARRIAGE COMPANY, OF CLEVELAND, OHIO.

VEHICLE STEERING MECHANISM.

No. 884,193.

Specification of Letters Patent.

Patented April 7, 1908.

Application filed November 12, 1904. Serial No. 232,455.

*To all whom it may concern:*

Be it known that I, WILLIAM McGLASHAN, a subject of Great Britain, residing at Cleveland, in the county of Cuyahoga and State of Ohio, have invented certain new and useful Improvements in Vehicle Steering Mechanism, of which the following is a specification, reference being had therein to the accompanying drawing.

This invention relates to improvements in vehicle steering mechanisms, and is especially intended for use in connection with and for the purpose of guiding an automobile.

The object of the present invention is to provide a simple and positive steering mechanism which will not be subject to lost motion between the steering wheel and its immediately coöperating mechanism, the latter of which is connected with the front wheel spindles of the vehicle, and which at the same time will prevent any lateral strain or jar upon the steering wheels of the vehicle from being conveyed to the steering wheel, for the reasons well understood by those skilled in this art.

In the accompanying drawings, Figure 1, is a longitudinal sectional view through the steering post, showing my improved mechanism. Fig. 2, is a detached view in plan of the casting located at the lower end of the steering post and which is suitably attached to the body of the vehicle, the bell-crank lever supported by this casting being shown partly in dotted and partly in full lines. Fig. 3, is a detached side-elevation of the longitudinally movable screw member which has its lower end extending into the casting shown in Fig. 2, and which is operatively connected to the bell-crank lever, the latter also being supported by the said casting.

I have not shown the vehicle steering wheels or their immediate connections, because that forms no part of my present invention, and is not necessary to a full understanding thereof.

As will be clearly understood from the following description, my invention may be connected with any of the well known forms of steering wheels and their connections, whereby they are moved together.

My present invention relates to a particular construction located at the lower end of the steering tube or rod which is connected through the medium of the usual rod 1 to the well known, or other form of steering wheel, and their immediate connections.

Referring now to my improvement, 2 indicates a casting which will be suitably attached to the floor or frame of the vehicle. This casting consists of an upper portion 3 and a lower portion 4 which are held together by suitable bolts passing through the perforated ears 4 of the said two parts of the casting. A bell-crank lever 5 is intermediately pivotally supported between the two parts of the casting at the point 6, the said lever being provided with laterally-extending spindles which form the pivotal point thereof. As illustrated in Fig. 1, this bell-crank lever 5 is pivotally supported by the casting at one side of the vertical center of the steering tube or rod 8. Projecting upward from the casting 2 is a sleeve 9 which is smaller in diameter than the portion 10 immediately therebelow, and the upper portion of the sleeve 9 is provided with a relatively larger internally screw-threaded split portion 11. The lower end of the steering tube or rod 8 extends into the enlarged portion 11 and is provided with a lateral flange 12. This lateral flange 12 is here shown as a separate part from the steering tube 8 and having an upwardly-extending part 14 within the lower end of the steering tube and brazed therein, and with a downwardly extending screw-threaded portion 15. It will be understood, however, that the flange and downwardly-extending portion 15, may be formed as a part of the steering tube or rod 8, without in any manner affecting the invention. Placed within the reduced portion 9 of said sleeve, is a longitudinally-movable elongated internally screw-threaded nut 16 which is adapted to receive the screw-threaded portion 15 carried by the steering tube or rod 8. The said nut 16 is provided with a downward extension 17 which is slotted longitudinally, as shown at 18, and passing transversely the slot and the lower end of said extension 17, is a pin 18'. Placed within this slot and loosely supported by the pin, is a hardened steel block 19. The inner end 20 of the bell-crank lever 5 is provided with a horizontal slot 21 which snugly fits the said block, the latter, however, adapted to slide in the slot 21.

An externally screw-threaded nut or sleeve 22 is placed in the enlarged portion 11 and has its lower end engaging the flange 12 of the steering post 8, whereby the steering post is held in position but may be readily removed by removing the said sleeve 22. This sleeve is clamped in position by means of a bolt 23 which passes through the perforated ears 24 of the longitudinal slit portion 25 of said enlarged part 11. From the foregoing it will be seen that the vertical portion of the sleeve 22 forms a longitudinal bearing, and that the end of the sleeve and flange 12 forms a transversely-arranged thrust-bearing for the steering post 8.

In the operation of my invention, the steering post or tube 8 is rotated by the hand-wheel 26 attached to its upper end. The rotation of the steering tube or post rotates the screw-threaded portion 15 within the internally screw-threaded nut 16 and either raises or lowers the nut, according to the direction of rotation. The vertical movement of the nut through the medium of the block 19 carried by its extension 17, causes the bell-crank lever to swing, and in turn the lower end 27 of said lever is caused to correspondingly move the connection 1 which is attached thereto, the latter moving the steering wheels in a manner which is well understood by those skilled in the art.

The foregoing construction is exceedingly simple and readily accessible, and owing to the elongated screw-threaded portion, will avoid the lost motion which is known to be present in the usual worm and worm segment now generally in use for connecting operatively the steering post with the bell crank lever.

From the foregoing description, it will be understood that the connection between the screw-threaded sleeve 16 and the inner end of the bell-crank lever 5, is in effect a pin and slot connection, which generically speaking is a sliding connection between the lever and the screw-threaded sleeve.

Having thus described this invention, what is claimed and desired to be secured by Letters Patent, is:—

1. An improved vehicle steering mechanism, comprising a supporting casing, a rotatable steering post having a longitudinal bearing and also a transverse thrust-bearing in the casing, a longitudinally-movable sleeve located within the casing and having internal screw-threads, the steering post having external screw-threads engaging the threads of the sleeve, means for preventing the rotation of the sleeve, and a connection between the sleeve and the steering wheels of the vehicle.

2. An improved vehicle steering mechanism, comprising a supporting casing, a rotatable steering post journaled therein and having screw-threads at its lower end, a longitudinal sleeve slidably mounted in said casing and having an internally screw-threaded opening receiving the screw-threaded end of the post, the lower end of said sleeve having forked members, a transverse bolt rigidly supported between said members, a block loosely mounted upon said bolt and an intermediately pivoted lever having one end bifurcated and fitting closely over the block and its opposite end adapted to be connected with the vehicle steering wheels.

3. An improved vehicle steering mechanism, comprising a supported casing, having an enlarged upper end, a rotatable steering post journaled therein and having a rigid annular flange resting upon the shoulder formed by the enlarged upper end, means within said enlarged upper end of the casing to prevent the upward movement of the flange, the lower end of the steering post screw-threaded, a longitudinal sleeve slidably mounted in said casing and having an internally screw-threaded opening to receive the screw-threaded end of the post and an intermediately pivoted lever having one end pivotally connected to the lower end of said sleeve and its opposite end adapted to be connected with the vehicle steering wheels.

4. An improved vehicle steering mechanism, comprising a supported casing having an enlarged upper end internally screw-threaded adjacent its upper end, a rotatable steering post journaled therein and having a rigid annular flange intermediate its ends and within the enlarged upper end of the casing and upon the shoulder formed therein, a sleeve screwed within the said enlarged upper end of the casing and engaging the upper face of the flange carried by the post to prevent the upward movement of the post, the lower end of the post having a screw-threaded portion, a longitudinal sleeve slidably mounted in said casing and having an internally-screw-threaded opening receiving the screw-threaded end of the post, the lower end of said sleeve having forked members, a transverse bolt rigidly supported between said members, a block loosely mounted upon the bolt, and an intermediately pivoted lever having one end bifurcated and fitting closely over the block and its opposite end adapted to be connected with the vehicle steering wheels.

In testimony whereof I affix my signature in presence of two witnesses.

WILLIAM McGLASHAN.

Witnesses:
HAROLD B. ANDERSON,
C. P. TRACY.